US008979494B1

(12) United States Patent
Myers (10) Patent No.: US 8,979,494 B1
(45) Date of Patent: Mar. 17, 2015

(54) VERTICAL AXIS HINGED SAIL WIND ENERGY MACHINE

(76) Inventor: Bradley Davis Myers, Auberry, CA (US)

(*) Notice: Subject to any disclaimer, the term of this patent is extended or adjusted under 35 U.S.C. 154(b) by 96 days.

(21) Appl. No.: 13/196,860

(22) Filed: Aug. 2, 2011

(51) Int. Cl.
F03D 3/02 (2006.01)
F03D 3/06 (2006.01)

(52) U.S. Cl.
CPC .................................. *F03D 3/068* (2013.01)
USPC ...................... 416/98; 416/132 A; 416/132 B (58) Field of Classification Search
USPC ............. 416/98, 120, 132 A, 132 B, 140, 141
See application file for complete search history.

(56) References Cited

U.S. PATENT DOCUMENTS

| | | | | |
|---|---|---|---|---|
| 1,626,313 | A | * | 4/1927 | Tuckey .......................... 416/118 |
| 4,218,183 | A | * | 8/1980 | Dall-Winther .................. 416/41 |
| 4,346,305 | A | * | 8/1982 | White ............................. 290/55 |
| 4,468,169 | A | * | 8/1984 | Williams ....................... 416/119 |
| 4,684,817 | A | * | 8/1987 | Goldwater ....................... 290/55 |
| 6,872,045 | B1 | * | 3/2005 | Weaver et al. .................. 415/4.2 |
| 2004/0228729 | A1 | * | 11/2004 | Migler ............................ 416/119 |
| 2006/0140765 | A1 | * | 6/2006 | Shih ........................... 416/132 B |
| 2009/0169382 | A1 | * | 7/2009 | Bond ............................. 416/133 |
| 2011/0068581 | A1 | * | 3/2011 | Lowery ........................... 290/55 |
| 2012/0301301 | A1 | * | 11/2012 | Sauer ........................ 416/170 R |

FOREIGN PATENT DOCUMENTS

DE 4401926 A1 * 7/1995

OTHER PUBLICATIONS

Klaus, Rotor for vertical axis wind generator, Jul. 27, 1995, Abstract for DE 4401926A1.*
Klaus, Rotor for vertical axis wind generator, Jul. 27, 1995, Machine translation for DE 4401926A1.*

* cited by examiner

*Primary Examiner* — Dwayne J White
*Assistant Examiner* — Liam McDowell
(74) *Attorney, Agent, or Firm* — Richard A. Ryan (57) ABSTRACT

An improved wind energy machine for capturing the wind to produce useful work, such as generating electricity. The wind energy machine has a rotating center hub with a center drive shaft and a vertical axis disposed therethrough. An output shaft is attached to or integral with the drive shaft. Extending outward from the center hub are a plurality of arms that each have an arm support structure comprising a plurality of frame members. The arms rotate the center hub and drive shaft. Pivotally attached to each arm support structure is at least one sail structure that supports a sail. The sail structures pivot to close the sails and engage the wind on one side of the machine and open to allow the wind to pass through on the opposite side. In a preferred embodiment, a pivoting kicker sail provides additional rotation action and a shroud structure helps trap the wind.

14 Claims, 5 Drawing Sheets

VERTICAL AXIS HINGED SAIL WIND ENERGY MACHINE

BACKGROUND OF THE INVENTION

A. Field of the Invention

The field of the present invention relates generally to wind turbines, windmills and other wind powered machines that utilize the energy of the wind to produce rotational torque through an output shaft to generate electricity, operate a pump or accomplish other useful work. More particularly, the present invention relates to such machines that have a vertically disposed rotational axis and which utilize hinged sails to capture the energy of the wind and produce the desired rotational torque. Even more particularly, the present invention relates to such machines that are relatively simple and inexpensive to manufacture, require little ongoing maintenance and are effective at producing rotational torque even in low wind speed conditions.

B. Background

Motors and other machines for converting a source of input energy to an output in the form of rotational torque that is delivered through an output shaft have been generally available for many years. The rotational torque at the output shaft is commonly utilized to produce electricity via a generator or power a pump, grinding wheel or other machine, turn a wheel and operate other devices. The input energy for such machines has been provided by people, animals, moving water, gravity, blowing wind, fossil fuels, nuclear materials and a variety of other sources. Over the years, there has been a desire to have machines which utilize energy from readily available, clean and renewable sources, such as water, wind or the sun, instead of using the limited more polluting sources of energy, such as petroleum, coal, uranium and the like. With regard to machines which use the power of moving water or wind, these machines are generally configured to result in a weight or force differential, provided by the weight of the water or force of the wind, on opposite sides of the machine's wheel or fan blades in order to rotate a shaft fixedly connected to the wheel or fan blades. The ideal configuration for such machines is to have as much of a weight or force imbalance as possible on the opposite sides of the wheel or fan blades so that the machine will generate the maximum amount of rotational torque at the output shaft. In general, the components of water or wind powered machines are beneficially shaped and configured in an attempt to achieve this result.

With regard to producing electricity, apparatuses and systems for converting a source of energy to useful power for generating electricity have been generally available for many years. A common arrangement for generating electricity is a large power plant that delivers the produced electricity to the end user over long distance, often very long distance, transmission lines. As is commonly known, such power plants are very complicated and very expensive, requiring large capital investment in the power plant and the transmission lines. Presently, most large power plants rely on traditional sources of energy, such as oil, natural gas, coal, nuclear, stored water and the like to produce electricity. There is a strong effort to provide alternative apparatuses and systems to power machines, particularly generators for producing electricity, that utilize energy sources which have less environmental impact, generally by being more readily available, cleaner and, preferably, renewable. For instance, many people and organizations have been attempting to utilize wind, solar, tidal and geothermal resources as a source of power to operate generators for the production of electricity. Although such sources of energy have been well known and, to some extent, in use for many years, it has only been relatively recent that substantially increased efforts have been directed towards improving the efficiency of these energy systems so they may be capable of generating more electricity. Currently, such alternative energy systems are a relatively small percentage of the total electricity production.

In general, the increased push for apparatuses and systems that generate electricity without utilizing conventional, non-renewable and polluting energy sources is a direct result of an increase in the number of devices which are powered by electricity, such as computers, air conditioning, vehicles, audio systems, kitchen appliances and a vast number of other devices, and the rapid expansion in the number of people who desire to utilize such devices. As well known, the increase in the supply of electricity to meet this demand will have to be supplied by those apparatuses and systems that are available, which, at least presently, primarily rely on hydrocarbon-based fuels. In general, as the need for electricity increases, the supply of fuel to produce electricity is further reduced, the environmental impacts of utilizing certain fuels worsen and the cost of using electricity increases. Most experts expect that the demand for electricity will substantially increase during the foreseeable future. In addition, consumers generally expect that electricity will be available to them when they need it, whether to operate an appliance, energize a light source, operate a machine or provide power to operate motor vehicles.

Although electricity is most often produced and provided to the public by large power plants via long distance transmission lines, there is a need for the production of electricity at or very near the location where it is needed. One advantage of such electricity production is that it eliminates the requirement to transmit electricity over long distances, thereby eliminating the cost to build long distance transmission lines, the cost of acquiring the right-of-way for the land and the use of the land to support those lines. For areas that are somewhat off of the normal power grid, the cost of building the necessary transmission lines and the cost to maintain those lines can be significant. To be effective, however, an apparatus and system for localized production of electricity must be of sufficient size to supply the desired amount of electricity and must be able to reliably supply that electricity. Presently, small wind, water and solar generators and generating systems for localized production of electricity are generally not widely utilized.

With regard to wind generating apparatuses and systems, the most common type are those which utilize a wind "propeller" configuration having a horizontally disposed rotational axis around which a plurality of propellor vanes rotate in response to blowing wind. These types of wind energy machines, also referred to as windmills and horizontal axis wind turbines, are commonly utilized throughout the world. One limitation of these machines is that the horizontal axis through propeller must face in the direction from which the wind originates, which requires the machine to rotate the propeller so that it is always facing into the wind. Generally, this results in somewhat complicated machinery that requires significant capital investment and relatively high maintenance costs. Another common problem with horizontal axis wind energy machines is that the surface area available for contact with the wind is somewhat limited in order to reduce the weight associated with the propeller. In addition, horizontal axis wind energy machines must be geared and otherwise configured to account for the differing speeds of rotation at the center and at the outward tip of the propeller blades. As will be readily appreciated by persons skilled in the art, propeller blades are generally configured and intended to create thrust and are somewhat inefficient as wind current collectors.

Vertical axis wind energy machines have a plurality of flat surfaces which rotate around a vertically disposed rotational axis in response to blowing wind. One advantage of these machines is that they are generally self-aligning in that they do not need to be directed into the wind, as they will rotate around the center axis no matter which direction the wind originates. Another advantage of these machines over horizontal axis wind energy machines is that vertical axis wind energy machines generally work better under low wind speed conditions and, partially as a result thereof, can be utilized closer to the ground, such as on the roof of a building or the like. Presently available vertical axis wind energy machines typically utilize fixed blades that require careful aerodynamic design in order to obtain desirable levels of torque output, which generally requires the sacrifice of blade surface area for weight. In addition, most prior art vertical axis wind energy machines require relatively high wind speeds to start the rotational movement of the machine. To compensate for deficiencies in operation, most presently available vertical axis wind energy machines are somewhat complicated to operate and expensive to purchase and/or install.

What is needed, therefore, is an improved wind energy machine that is configured to more effectively and efficiently rotate wind collecting surfaces around a center axis to rotate an output shaft for use in generating electricity or to power another machine. The preferred wind energy machine will be able to more beneficially and efficiently produce rotational torque as a result of blowing wind. Preferably, an improved wind energy machine will be able to produce the desired work activity at relatively low wind speeds and be particularly suitable for localized production and use of such work activity, such as generation of electricity. The preferred wind energy machine should be relatively simple to install and operate and be relatively inexpensive to manufacture.

SUMMARY OF THE INVENTION

The vertical axis hinged sail wind energy machine of the present invention provides the benefits and solves the problems identified above. That is to say, the present invention discloses an improved wind energy machine which more effectively and efficiently utilizes energy from the wind to produce rotational torque through an output shaft that can be utilized to generate electricity, operate a pump or accomplish other useful work. The improved wind energy machine of the present invention is the type having a generally vertically disposed rotational axis. In a preferred configuration, the vertical axis wind energy machine of the present invention has its vertical rotational axis disposed through a center hub having a plurality of outwardly extending, generally horizontally disposed arms that each support one or more sails that pivot to open or close so as to capture the wind and rotate the center hub. The machine of the present invention will rotate in response to wind from any direction. The present vertical axis wind energy machine generates electricity, operates a pump or accomplishes other useful work without reliance on fossil or other non-renewable sources of energy and with no output of pollutants. The new vertical axis wind energy machine of the present invention is particularly useful for localized production of electricity. In a preferred configuration, the new wind energy machine is simple to install and operate and relatively inexpensive to manufacture.

In a preferred embodiment, the vertical axis wind energy machine has a center hub or core component which supports a plurality, typically four to six, outwardly extending horizontal arms that each support one or more hinged sail structures that pivot between their open and closed positions to rotate the center hub and rotatably drive an output shaft to generate electricity, operate a pump or accomplish other useful work. The hinged sails pivot against the arm structure when hit with frontal wind to cause the wind energy machine to rotate. When the arm reaches the downwind back most point, the sails on that arm pivot in response to wind on the backside of the sails to an open position at a sail angle that continues to power the arm a few more degrees of rotation. The sails then move to fly upwind, in effect becoming a trailing rudder like member, with low drag to allow other sails, on other arms, to rotate the center hub. At the upwind most point, the sails on this arm are again pushed against the arm structure to push (rotate) the arm. Torque is created by the distance of the sail from the hub and the surface area of the sail. Unlike some prior art machines, the wind energy machine of the present invention works well in light winds. Wind from any direction automatically causes the sails to adjust and turn the machine in the same, single direction. The wind energy machine of the present invention is particularly useful for localized production of electricity or to provide power that can be utilized to operate other machines. Homes and businesses can utilize the wind energy machine of the present invention to supplement or provide all of their electrical needs. For instance, electricity generated by the present invention can be directly fed into a structure through its electrical meter. Alternatively, the energy produced by the machine could be stored in a battery storage and inversion system, or by compression of air, hydraulic accumulator storage, flywheel storage or lifting of water or other ballast for use of power during periods of very calm or no wind. The wind energy machine could be placed on a home, office, store or a wide variety of other structures or mounted onto existing power poles to supplement the power grid. Older style propeller blade wind energy machines could be retrofitted to utilize the more efficient wind collectors of the present invention.

In one aspect of the present invention, the wind energy machine generally comprises a center hub having a vertical axis disposed therethrough, a drive shaft axially aligned with the vertical axis of the center hub, a plurality of arms extending outwardly from the center hub, a plurality of sail structures associated with each of the arms and a kicker sail structure at the distal end of each arm. The center hub is configured to rotate about the vertical axis and the drive shaft is connected to or integral with an output shaft so as to operate a work object, such as an electrical generator, pump or other machine. Each of the arms has a proximal end disposed towards the center hub, with the distal end being disposed outwardly therefrom. Each arm has an arm support structure with an upper frame member, a lower frame member and one or more support frame members interconnecting the upper and the lower frame members in order to maintain the upper frame member in spaced apart relation to the lower frame member and define a wind collection zone therebetween. Rotation of the arms rotates the center hub about the vertical axis to rotate the drive shaft and operate the work object. The sail structures are pivotally attached to the arm support structure so as to pivot between an open position that is substantially aligned with a wind direction and a closed position that is substantially perpendicular to the wind direction. The sail structures sized and configured to substantially close the wind collection zone when they are in the closed position. Each sail structure has one or more frame members that support a sail which is configured to collect the wind energy from the wind in the wind collection zone when the sail structure is in the closed position. One of the sail structures on each arm is disposed at or near the distal end of the arms so as to define a distal sail structure. The kicker sail structure is attached to or integral with the distal sail structure to pivot therewith relative to the arm support structure. The kicker sail structure has a kicker sail that is pivotally connected to the kicker sail structure so as to pivot the kicker sail structure and the distal sail structure between the open and closed positions.

In a preferred embodiment, the wind energy machine also has a limiting mechanism that is associated with each sail structure for limiting pivoting movement of the sail structure relative to the arm support structure. In one embodiment, the limiting mechanism comprises the support frame members for the sail structures toward the proximal end of the arms and a stop section for the sail structure at the distal end of the arms. In another embodiment, the limiting mechanism is an elongated restraining member, such as a rope, chain, cable or the like, that interconnects the various sail structures and either the arm support structure, the center hub or the drive shaft. Alternatively, various other elongated members can be utilized for the restraining member, such as a shaft, pole, stick or the like. In a preferred embodiment, the wind energy machine has a shroud structure associated with each of the arms. The shroud structure has an upper shroud that is attached to or integral with the upper frame member of the sail support structure and a lower shroud that is attached to or integral with the lower frame member of the sail support structure to define the wind collection zone between the upper and lower shrouds. Preferably, the upper and lower shrouds are both aerodynamically configured to better direct wind energy into the wind collection zone to increase the torque produced by machine. Preferably, the center hub as a solid side wall that is configured to direct wind that hits the center hub into the wind collection zone to further increase torque from the machine.

Accordingly, the primary aspect of the present invention is to provide an improved wind energy machine that has the advantages discussed above and which overcomes the disadvantages and limitations associated with prior art windmills, wind turbines and other wind energy machines.

It is an important aspect of the present invention to provide a wind energy machine that more effectively and efficiently captures wind energy to produce rotational torque that can be utilized to generate electricity, operate a pump or accomplish other useful work.

It is also an important aspect of the present invention to provide a wind energy machine having a vertically disposed rotational axis around which a plurality of outwardly extending arms, each with one or more pivoting wind capturing surfaces, rotate to more efficiently and effectively capture the wind so the machine may be utilized to produce electricity or other useful work.

It is also an important aspect of the present invention to provide a vertical axis wind energy machine that is better able to effectively and efficiently capture the wind, even at relatively low wind speeds, to generate electricity or accomplish other useful work.

It is also an important aspect of the present invention to provide an improved vertical axis wind energy machine that has its vertical rotational axis disposed through a center hub having a plurality of outwardly extending, generally horizontally disposed arms that each support one or sails that pivot to open or close to capture the wind and rotate the center hub.

It is also an important aspect of the present invention to provide an improved vertical axis wind energy machine that utilizes a kicker sail at the distal end of each horizontally disposed arm to provide improved rotational movement, particularly in relatively low wind speeds.

It is also an object of the present invention to provide an improved vertical axis wind energy machine that is relatively simple to assemble and operate and relatively inexpensive to manufacture so as to be particularly beneficial for localized generation of electricity or to power a pump or other machines.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show and discuss certain shapes and configurations for the various components of the vertical axis hinged sail wind energy machine, those skilled in the art will readily appreciate that this is merely for purposes of simplifying this disclosure and that the present invention is not so limited.

Figure 1:
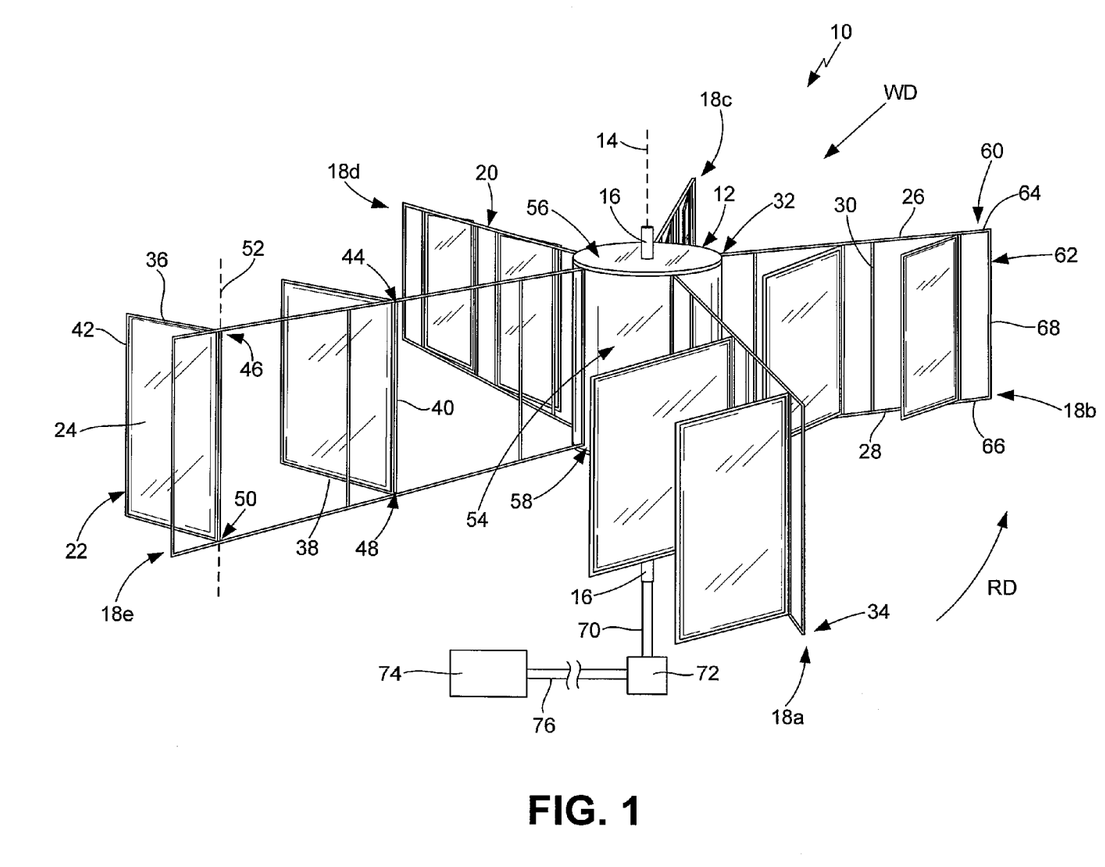
FIG. 1 is a top perspective view of a wind energy machine configured according to a first embodiment of the present invention shown rotating in response to the wind and connected to a generator for generating electricity.
Figure 2:
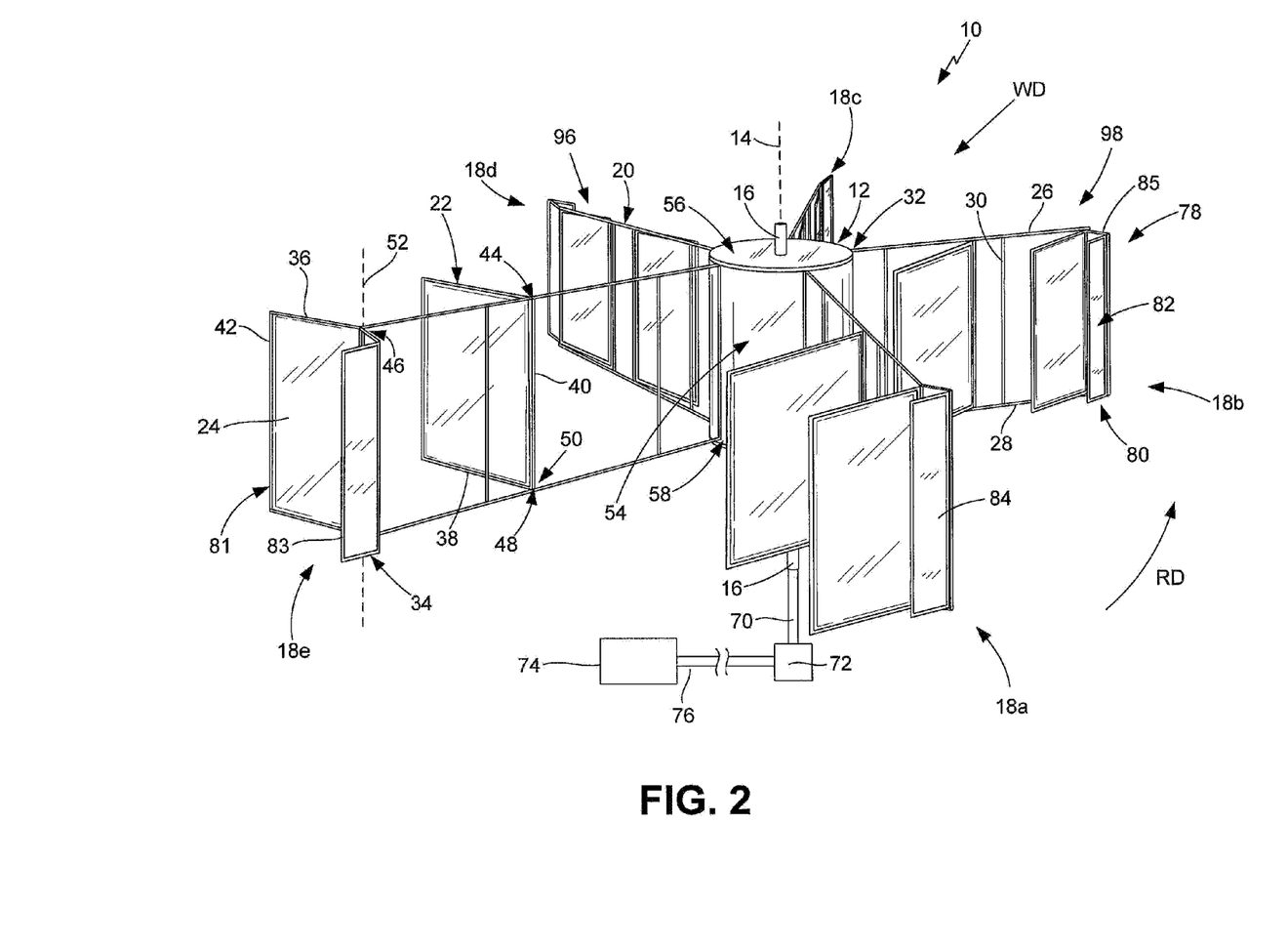
FIG. 2 is a top perspective view of a wind energy machine configured according to a second embodiment of the present invention shown rotating in response to the wind and connected to a generator for generating electricity.
Figure 3:
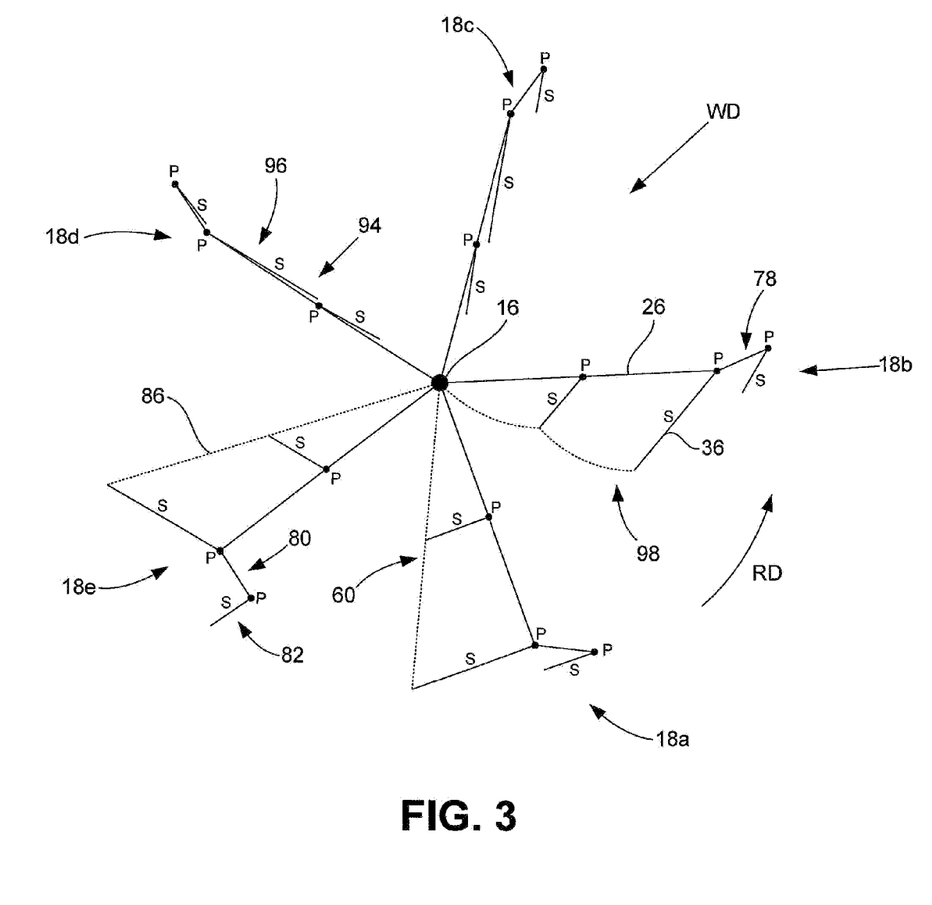
FIG. 3 is a top schematic view of the wind energy machine of FIG. 2 showing the use of restraining members to limit the movement of the sails.
Figure 4:
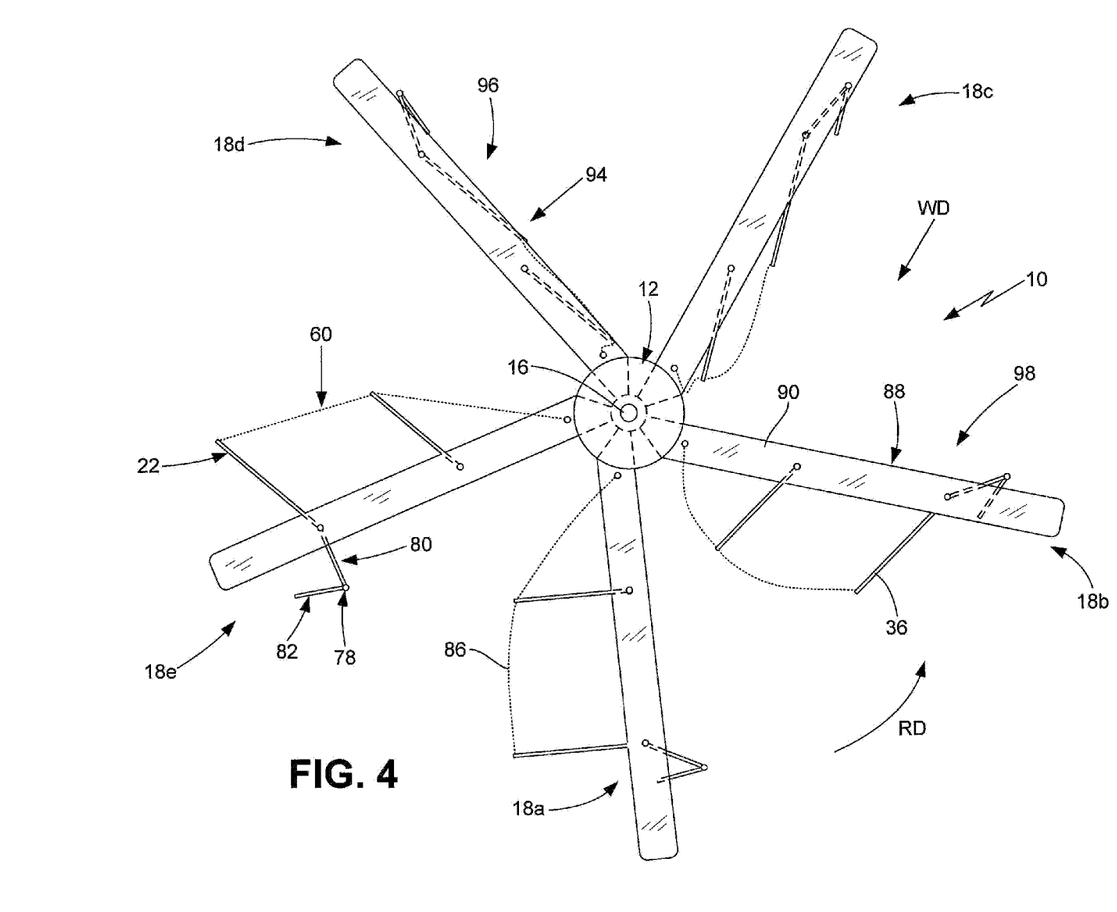
FIG. 4 is a top view of a wind energy machine configured according to a third and preferred embodiment of the present invention showing the use of a shroud structure on the outwardly extending arms.

An improved wind energy machine that is configured pursuant to various embodiments of the present invention is shown generally as 10 in FIGS. 1 through 4. As set forth in more detail below, the wind energy machine 10 of the present invention has a center hub 12 with a vertical axis 14 therethrough around which the center hub 12 rotates in the rotational direction RD in response to wind, which is shown in the figures as coming from the wind direction WD, as best shown in FIGS. 1, 2 and 4. In one preferred embodiment, the center hub 12 is attached to or integral with a center drive shaft 16 such that the two components rotate together around a base (not shown) which rotatably supports center hub 12. Alternatively, center drive shaft 16 could be stationary and with center hub 12 being configured to rotate relative to center drive shaft 16. In the embodiment shown in the figures, the drive shaft 16 is axially aligned with the center hub 12 such that the vertical axis 14 passes axially through the drive shaft 16. The base could be a separate component that attaches to the roof of a building, a separate stand-alone structure, a power pole or other structure. In such a configuration, the base will have one or more bearings or like components which support and allow rotation of the center hub 12 and the remaining components of wind energy machine 10. In this configuration, the base of the wind energy machine 10 could be mounted at a location where localized generation of electricity, or other work is desired. Alternatively, the base could be the structure itself or the wind energy machine 10 could be suspended from cables or disposed around a pole or other pole-like structure. As set forth in more detail below, wind energy machine 10 is configured such that it will always rotate, relative to the base, in only the rotational direction RD regardless of wind direction WD. In the embodiment shown in the figures, the wind energy machine 10 rotates counterclockwise (from a top view).

Attached to and rotating with center hub 12 of wind energy machine 10 are a plurality of outwardly extending arms, referred to collectively as 18, that each have an arm support structure 20 that pivotally supports one or more sail structures 22 that each have a sail 24 which is selected so as to capture the wind when the arm 18 on which its sail structure 22 is mounted is in the wind capturing position. In the embodiments shown in FIGS. 1 through 4, wind energy machine 10 has five outwardly extending arms 18, shown as first arm 18a, second arm 18b, third arm 18c, fourth arm 18d and fifth arm 18e. As explained in more detail below, at any given moment in the rotational cycle of wind energy machine 10, each arm 18a-e is at a separate stage with regard to the open/close pivoting of sail structures 22 and the positions of the sails 24 relative to the wind direction WD. As shown with regard to arm 18b, the arm support structure 20 comprises an upper frame member 26, a lower frame member 28 and one or more vertical frame members 30 interconnecting the upper 26 and lower 28 frame members to form generally rectangular shaped arms 18, as best shown in FIGS. 1 and 2. In a preferred embodiment, each arm support structure 20 has a plurality of generally vertical support frame members 30 that support and interconnect the upper 26 and lower 28 frame members. The proximal end 32 of the arm support structure 20 is fixedly attached to center hub 12 and the distal end 34 thereof extends outwardly from the center hub 12.

As best shown in FIGS. 1 and 2, each sail structure 22 comprises an upper frame member 36, a lower frame member 38, an inner or proximal frame member 40 pivotally attached to the arm support structure 20 and an outer or distal frame member 42 that together define a sail space in which the sail 24 is positioned. In a preferred embodiment, the sail 24 at least substantially fills the entire space defined by the frame members 36, 38, 40 and 42 of sail structure 22. Preferably, the sail 24 completely fills this space to prevent wind from passing between the sail structure 22 and the sail 24 when the sail 24 is engaging the wind to prevent loss of wind force that would result in lower efficiency for the wind energy machine 10. In the preferred embodiment, sail 24 is sized and configured to be slightly loose fitting inside the sail space defined by the frame members 36, 38, 40 and 42 so the sail 24 will define a generally cup-shaped configuration (or the like) when the arms 18 are in their wind collecting position, such as arm 18d in FIGS. 1 and 2, as it rotates. As will be readily appreciated by those skilled in the art, a cup-shaped configuration of sail 24 will more effectively and efficiently collect wind to push the arm 18 and rotate the wind energy machine 10. The sail structure 22 should be shaped and configured to at least somewhat facilitate formation of desired cup-shape configuration of the sail 24 when it is under load from the wind. The use of the open frame, defined by frame members 36, 38, 40 and 42, shown in the figures will provide this cup-shaped configuration.

The upper end 44 of the inner frame member 40 of the sail structure 22 is pivotally attached to the upper frame member 26 of arm support structure 20 utilizing an upper pivot mechanism 46. The lower end 48 of the inner frame member 40 of sail structure 22 is pivotally attached to the lower frame member 28 of the arm support structure 20 utilizing a lower pivot mechanism 50. Both upper 46 and lower 50 pivot mechanisms are configured to allow the sail structure 22 to pivot about a sail pivot axis 52, which is parallel to the vertical axis 14, that allows it to pivot back and forth relative to the arm support structure 20 in response to the wind blowing against the sail 24 thereof. In one embodiment, both upper 46 and lower 50 pivot mechanism comprise a pin and socket type of arrangement, the configuration of which is generally well known in the art. A variety of other different pivoting mechanisms, also generally well known in the art, can be utilized for the upper 46 and lower 50 pivot mechanisms.

In the preferred embodiment of the wind energy machine 10 of the present invention, the center hub 12 has solid side wall 54 that interconnects a top wall 56 and bottom wall 58 to provide substantially elongated cylindrical structure that directs wind from the wind direction WD to the arms 18. The solid structure for center hub 12 is preferred in order to prevent loss of wind energy that would otherwise escape through the center of the wind energy machine 10, as is common for prior art vertical axis wind energy machines. By directing the wind to the arms 18, the solid cylindrical structure of the center hub 12 provides for more effective utilization of the wind energy and, as a result, improves the overall efficiency of wind energy machine 10, which is particularly important for generating electricity or accomplishing other work objectives in low wind velocity conditions. Preferably, the center hub 12 is made out of relatively light weight materials so as to not hinder the operation of the wind energy machine 10. In one embodiment, the center hub 12 is covered with plastic or the like.

In the preferred embodiments of the present invention, the wind energy machine 10 comprises a limiting mechanism 60 for limiting the pivot range of the outer sail structure 22. As will be appreciated by those skilled in the art, full pivoting of the outer sail structure 22 around the distal end 34 of the arms 18 will substantially impair the operation and efficiency of the wind energy machine 10. In the embodiment shown in FIG. 1, the limiting mechanism 60 of wind energy machine 10 is a stop section 62 disposed at the distal end 34 of each of the arms 18 that is positioned and configured to prevent the outer sail structure 22 from pivoting around the distal end 34 of arms 18. In the embodiment shown, the stop section 62 comprises an upper extending member 64 that generally extends outward from the upper frame member 26, a lower extending member 66 that generally extends outward from lower frame member 28 and a stop member 68 that interconnects the upper 64 and lower 66 extending members, as best shown with regard to second arm 18b. In the embodiment shown in FIG.

1, upper 64 and lower 66 extending members are substantially horizontally disposed and the stop member 68 is substantially vertically disposed between the two horizontal extending members 64/66. The stop member 68 is positioned to prevent the outer sail structure 22 from fully pivoting around the distal end 34 of the arms 18. A variety of other limiting mechanisms 60 can also be utilized with To achieve the desired work product, such as generating electricity, operating a pump or achieving other beneficial work, the center drive shaft 16 connects to an output shaft 70, typically in a manner that rotates output shaft 70, so as to operate a work object. In the embodiment shown in FIGS. 1 and 2, in which the work product is generating electricity, the output shaft 70 connects to a gearbox 72 that redirects the rotational torque to an electrical generator 74 (as the work object) via connecting shaft 76. The use of gearbox 72 and electrical generator 74 with wind energy machine 10 of the present invention is provided for exemplary purposes only. As will be readily appreciated by those skilled in the art, output shaft 70 can instead operatively connect to a pump or other machine to operate the pump or machine or connect to other devices to operate those devices. The preferred embodiment of the wind energy machine 10 also includes a free-spinning mechanism, such as spring release device or the like, that is configured to allow the arms 18 of wind energy machine 10 to freely spin in case of high wind speeds to avoid damage to the components of wind energy machine 10. In one embodiment, the free-spinning mechanism could be configured to position the various sail structures 22 such that the sails 24 thereof are directed into the wind, thereby allowing the wind to pass through the wind energy machine 10. The free-spinning mechanism could also be beneficially utilized during set-up of the wind energy machine 10 to ease handling of the machine 10 by preventing spinning of the arms 18.

Figure 5:
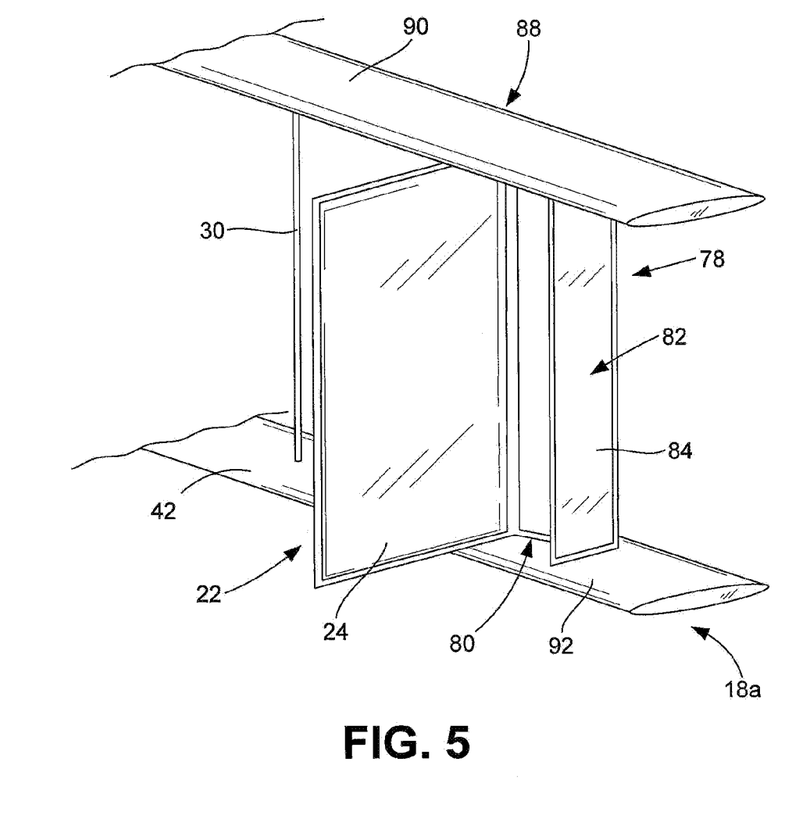
FIG. 5 is a side perspective view of one of the arms of the wind energy machine of FIG. 4 particularly showing the upper and lower shroud structures.

The embodiments of wind energy machine 1 configured according to a preferred configuration of the present invention is shown in FIGS. 2 through 5. These figures show the use of a kicker sail structure 78 located at the distal end 34 of each of the arms 18 to provide additional whipping motion to drive arms 18 in the rotational direction RD, particularly with regard to placing the relevant arms 18 in the wind loaded positions, such as shown for fourth arm 18d. The kicker sail structure 78 shown in the figures comprises a generally open kicker support frame 80 that is attached to or integral with the sail structure 22 at the distal end 34 of each arm 18 (which sail structure 22 is identified specifically as the distal sail structure 81) and a kicker sail section 82 that is pivotally attached to the kicker support frame 80, as best shown in FIGS. 2 and 5. In one embodiment, the kicker support frame 80 is configured substantially the same as stop section 62 described above, except the kicker support frame is integral with or attached to the inner frame member 40 of the distal sail structure 81 of each arm so as to pivot therewith relative to the arm support structure 20 around the sail pivot axis 52 of the distal sail structure 81. The kicker sail sections 82, which are attached to the kicker support frame 80 so as to pivot independent thereof, is configured substantially the same as, but generally smaller than, the sail structures 22 with a kicker sail 84 positioned between the plurality of frame members 83 that define the kicker sail section 82, as best shown in FIGS. 2 and 5. As above, preferably the kicker sail 84 is configured to at least substantially fill the entire space defined by the frame members 83 of the kicker sail section and be configured so as to be able to have a slight cup-shaped configuration when the kicker sail 84 is loaded by the wind. Kicker support frame 80 has a plurality of support frame members 85, as shown in FIG. 2, that define the kicker support frame 80. In a preferred embodiment, the upper 36 and lower 38 frame members of the sail structure 22 at the distal end 34 of the arms 18 is integral with the like positioned support frame members 85 of the kicker support frame 80 such that they share a single inner frame member 40, which pivots relative to the arm support structure 20 as a result of the wind loading sail 24 and the kicker sail 84. As set forth above for the sail structures 22, kicker sail section 82 can pivotally connect to kicker support frame 80 with a pin/socket type of pivoting mechanism at the top and bottom of the frame members 83 to allow the kicker sail section 82 to pivot independent of the combined kicker support frame and distal sail structure 81 and arm support structure 20. Other types of pivoting mechanisms can also be utilized with the kicker sail section 82 to allow it to pivot relative to kicker support frame 80.

In a preferred embodiment, where the frame members 85 of kicker support frame 80 are integral or fixedly attached to the upper 36 and lower 38 frame members of the distal sail structure 81, as best shown in FIGS. 2 and 5, the angle formed by the frame members 36/38 and their respectively positioned frame members 85 with inner frame member 40 is approximately 150 degrees. With the frame members 36/38/40 of the distal sail structure 81 being integral or attached to frame members 85 of the kicker support frame 80, the two frames will pivot together, with these frames sharing the inner frame member 40 that pivots relative to the arm support structure 20. The use of the kicker sail structures 78 significantly enhances the rotational operation of the wind energy machine 10 of the present invention. Being at the distal ends 34 of the arms 18, the kicker sail structures 78 substantially increases the amount of rotational torque created by the wind energy machine 10 and available for rotating the output shaft 70 and generating electricity at electrical generator 74 and/or creating other useful work. When the wind hits the relevant kicker sail structure 78, it will cause the relevant distal sail structure 81 to more quickly move, such as a snap-like action, to the position where the sail 24 of the distal sail structure 81 is fully loaded (i.e., at arm 18d in FIG. 2) or not loaded (i.e., at arm 18b in FIG. 2). This snap-like motion will benefit the operation of wind energy machine 10 by more quickly loading and unloading the sail structures 22.

In a preferred embodiment of the present invention, the wind energy machine 10 utilizes one or more elongated restraining members 86 associated with each of the arms 18 as the limiting mechanism 60, as shown in FIGS. 3 and 4, to limit the amount of pivoting that the sail structures 22 are allowed to move when being whipped around by the wind rotating the wind energy machine 10. As shown in FIGS. 3 and 4, the elongated restraining members 86 interconnect the center hub 12 or arm support structure 20 and the distal portion of the frame members 36, 38 and/or 42 of the sail structure 22. The restraining members 86 are sized and configured to prevent full open swinging of the sail structures 22 during rotational operation of the wind energy machine 10. In addition, use of the restraining members 86 to connect the sail structures 22 together also prevents the inside sail structure 22 (i.e., being closer to the center hub 12) from opening first and possibly preventing the outer sail structure 22 from opening. As shown in FIG. 4, depending on the positioning of any particular arm 18, the restraining member 86 associated therewith may be taut, as shown with regard to fifth arm 18e, or it may be loose, as shown with regard to the second arm 18b and third arm 18c. The taut condition of the restraining member 86 of fifth arm 18e prevents any further pivoting movement of the sail structures 22. The restraining members 86 can comprise a rope, chain, wire, cable or a variety of other similarly configured materials. The material chosen for the restraining members 86 should be strong and, preferably, light weight.

In the preferred embodiment of the wind energy machine 10 of the present invention, each arm also comprises a shroud structure 88, as shown in FIGS. 4 and 5. The shroud structure 88 has an upper shroud 90 and a lower shroud 92 that are shaped and configured to better direct the wind into the wind collection zone 94, shown in FIGS. 3 and 4, particularly when the relevant arm 18 is positioned where it can achieve maximum wind loading, such as for the fourth arm 18d in the figures. Preferably, the shroud structure 88 will extend to the distal end 34 of the arms 18, including the kicker sail structures 78 if utilized with wind energy machine 10. In conjunction with the closed sail structures 22, which when closed entirely or at least substantially closes the area between the upper 90 and lower 92 shrouds (or upper frame member 26 and lower frame member 28 in the above-described embodiment), the shroud structure 88 traps the wind in the wind collection zone 94 to more effectively and efficiently utilize the wind, which is particularly important in low or relatively low wind speed conditions. In a preferred embodiment, the upper 90 and lower 92 shrouds have a cross-sectional shape similar to an aerodynamically configured wing and have sufficient width to effectively trap the wind between the shrouds 90/92 and against the closed sail structures 22. The shape will better direct wind into the wind collection zone 94 when loading certain arms 18 and help direct the wind force away from the wind collection zone 94 when the arms 18 are in the position where when loading in the wind collection zone 94 is not desired, such as for the second arm 18b when it is being moved around to the area of the wind energy machine 10 where wind loading will take place. The extra width of the shroud structure 88, compared to the much narrower upper 26 and lower 28 frame members utilized in the above embodiment, will trap the wind in the wind collection zone 94. In a preferred embodiment, the upper 90 and lower 92 shrouds are substantially perpendicular to the vertical axis 14 and sail pivot axis 52 and generally parallel to the ground. Other configurations for shroud structure 88 can also be utilized with the wind energy machine 10.

The materials utilized for the various components of the wind energy machine 10 of the present invention should be selected so as to be generally light weight yet sufficiently strong to withstand the forces generated by the wind and the rotational movement of the arms 18 and pivoting of the sail structures 22. As will be readily appreciated by those skilled in the art, there are many different types of materials that can be utilized for the various frame and other structural components of the wind energy machine 10 that require a certain amount of rigidity to perform as intended, including aluminum and other metals, composites, plastics, wood and the like. With regard to sails 24 and kicker sails 84, in a preferred embodiment the materials are selected so as to be at least somewhat flexible so sails 24/84 will obtain the desired cup shape when loaded with the wind. Materials such as canvas, plastic, thin sheet metal and the like are believed to provide the desired shape effect and sufficiently load the wind energy machine 10. Alternatively, the material for sails 24/84 can be selected so as to be stiff between the relevant frame members, thereby not changing shape when wind loaded. Preferably, in the selected materials and the configuration of those materials will be chosen so as to retain the light weight, easy to handle and affordable features of the wind energy machine 10.

In operation, the wind will load the wind energy machine 10 from the wind direction WD and so as to rotate the machine 10 in the rotational direction RD, as shown in FIGS. 1 through 4. One benefit of the vertical axis wind energy machine 10 is that it is self-correcting, in that no matter what direction the wind comes from, the machine 10 will rotate as shown in the figures and described below. In addition, the wind energy machine 10 of the present invention is self-starting, not requiring any other source of energy, other than the wind, to start rotating around the vertical axis 14. As shown in FIGS. 1 through 4, the wind will cause the sail structures 22 to close against the support frame members 30 of the arm support structure 20 on the loaded side of the machine 10 to place the sail structures 22 in their closed position 96, which is best shown with regard to the fourth arm 18d, and load the wind collection zone 94 so as to rotate the machine 10 about the vertical axis 14 through center hub 12. The center hub 12 will rotate the center drive shaft 16, which will rotate the output shaft 70 that is attached to or integral with the center drive shaft 16. Rotation of the output shaft 70 can be utilized to perform useful work, such as generating electricity by use of electrical generator 74 or other work object to accomplish other work objectives, such as to operate a pump or other device. In a preferred embodiment, when sail structures 22 are in their closed position 96 the sails 24 thereof will form into at least a slight cup shape in order to better collect the wind, particularly in low wind speed conditions. When completely closed in the closed position 96, the sail structures will be substantially perpendicular to the wind direction WD. As a result of the configuration of the sail structures 22, even at low wind speeds the wind energy machine 10 of the present invention will be able to generate rotational torque that can be utilized at the output shaft 70 to operate a work object, such as generator 74, to generate electricity or accomplish other work. Due to the leverage created by sail structures 22 on the arms 18, the rotation of the arms 18 about the center hub 12 will produce a large amount of torque, particularly relative to momentum created by propeller types of wind energy machines.

Each of the sail structures 22 will open to an open position 98, such as seen viewing from the fifth arm 18e to the first arm 18a and then to the second arm 18b, in which the sail structures 22 are substantially parallel with the wind direction WD to allow the wind to pass with as little restriction as possible through those arms 18. Viewing from the fifth arm 18e to the second arm 18b, the angle of the sail structures 22 to the wind direction WD becomes shallower, resulting in less and less loading, until there is substantially no loading at second arm 18b. Viewing from the position of second arm 18b to the position of third arm 18c, the sail structures 22 begin closing and receiving more and more load from the wind, until they are fully loaded, such as at the position of third arm 18d. When fully loaded, the sail structures 22, with sails 24, fully or at least substantially close the space between the shroud structure 88 or, if not utilized, between the frame members 26/28 of the arm support structure 20 to close off the wind collection zone 94 so as to utilize as much of the wind as possible for rotating center hub 12 and drive shaft 16. One advantage of the wind energy machine 10 of the present invention, particularly when the restraining members 86 are utilized, is that the fifth arm 18e and first arm 18a, on the open side of the wind energy machine 10, still provide force to assist with rotating the wind energy machine 10 about the vertical axis 14. The operation thereof is somewhat similar to the sails of a sailboat or windsurfer. The ability to provide rotating force on both sides, the open and closed sides, greatly benefits the operation of wind energy machine 10 of the present invention, particularly in low wind speed conditions. Pivoting of the sail structures 22, with sails 24, facilitates the ability of machine 10 to take energy off of both the side disposed generally into the wind and the side that is disposed generally away from the wind, further distinguishing the wind energy machine 10 of the present invention from other vertical axis wind machines and propellor or fixed wing types of wind machines. In effect, the arms 18e and 18a on the back side of the machine 10 assist with redirecting themselves into the wind to collect as much wind energy as possible.

The wind energy machine 10 of the present invention can be utilized with a wide variety of different mounting configurations. For instance, the wind energy machine 10 can be mounted around a telephone pole or other vertically disposed pole or pole-like member. To facilitate such a mounting system, the center hub 12 can be configured in a ring or donut that is placed around the pole. Alternatively, the wind energy machine 10 of the present invention can be hung from cables or other support devices to rotate in response to wind movement. The cables can be suspended from a house, office, barn, frame and a variety of other structures. In use, wind energy machine 10 can be configured to produce electricity or accomplish other work at the location where the electricity or work will be utilized. With regard to electrical production, the wind energy machine 10 could potentially eliminate the need for a large power plant and the associated transmission lines to supply the electricity to the location where the electricity is needed.

While there are shown and described herein one or more specific embodiments of the invention, it will be readily apparent to those skilled in the art that the invention is not so limited, but is susceptible to various modifications and rearrangements in design and materials without departing from the spirit and scope of the invention. In particular, it should be noted that the present invention is subject to various modifications with regard to any dimensional relationships set forth herein, with regard to its assembly, size, shape and use and with regard to the materials used in its construction. For instance, there are a number of components described herein that can be replaced with equivalent functioning components to accomplish the objectives of the present invention.

What is claimed is:

1. A wind energy machine, comprising:
    a vertically disposed center drive shaft having a vertical axis therethrough;
    an output shaft connected to or integral with said center drive shaft so as to operate a work object;
    a plurality of arms extending outwardly from said center drive shaft, each of said arms having a proximal end disposed towards said center drive shaft and a distal end disposed outwardly from said center drive shaft, each of said arms having an arm support structure comprising at least an upper frame member, a lower frame member and one or more support frame members interconnecting said upper frame member and said lower frame member to maintain said upper frame member in spaced apart relation to said lower frame member so as to define a wind collection zone therebetween, said arms attached to said center drive shaft and configured to rotate said center drive shaft about said vertical axis;
    a plurality of sail structures associated with each of said arms, each of said sail structures pivotally attached to said arm support structure of one of said arms so as to pivot between an open position that is substantially aligned with a wind direction and a closed position that substantially closes said wind collection zone, each of said sail structures having a sail configured to collect wind energy from the wind in said wind collection zone when said sail structure is in said closed position, one of said plurality of sail structures on each of said arms being disposed at or near said distal end of said arms so as to define a distal sail structure;
    a kicker sail structure attached to or integral with said distal sail structure so as to pivot therewith relative to said arm support structure, said kicker sail structure having a kicker sail pivotally connected to said kicker sail structure so as to pivot said kicker sail structure and said distal sail structure between said open position and said closed position, said kicker sail structure comprising a kicker support frame and a kicker sail section, said kicker support frame disposed between said distal sail structure and said kicker sail section, said kicker support frame having one or more frame members attached to or integral with one or more frame members of said distal sail structure, said kicker sail disposed in and supported by said kicker sail section; and
    means associated with said sail structure for limiting pivoting movement of said sail structure relative to said arm support structure.

2. The wind energy machine of claim 1 further comprising a center hub attached to said center drive shaft and to each of said arms, said center hub configured to rotate with the rotation of said arms so as to rotate said center drive shaft and operate said work object.

3. The wind energy machine of claim 2, wherein said center hub has one or more side walls configured to at least substantially close said center hub to direct wind away from said center hub to said wind collection zone.

4. The wind energy machine of claim 1, wherein said limiting means comprises a stop section at said distal end of each of said arms, said stop section configured to prevent pivoting of said sail structure past said stop section.

5. The wind energy machine of claim 1, wherein said limiting means comprises a restraining member interconnecting said sail structure and at least one of said arm support structure, said center drive shaft and a center hub, wherein said center hub is attached to said center drive shaft and to each of said arms.

6. The wind energy machine of claim 1 further comprising a shroud structure associated with each of said arms, said shroud structure having an upper shroud attached to or integral with said upper frame member of said sail support structure and a lower shroud attached to or integral with said lower frame member of said sail support structure so as to define said wind collection zone therebetween, at least one of said upper shroud and said lower shroud being aerodynamically configured.

7. The wind energy machine of claim 1, wherein said sail structures are disposed at or near said distal end of said arms, said wind energy machine further comprising a kicker sail structure attached to or integral with said sail structure so as to pivot therewith relative to said arm support structure, said kicker sail structure having a kicker sail pivotally connected to said kicker sail structure so as to pivot said kicker sail structure and said sail structure between said open position and said closed position.

8. A wind energy machine, comprising:
    a center hub having a vertical axis disposed therethrough, said center hub configured to rotate about said vertical axis;
    a plurality of arms extending outwardly from said center hub, each of said arms having a proximal end disposed towards said center hub and a distal end disposed outwardly therefrom, each of said arms having an arm support structure comprising an upper frame member, a lower frame member and one or more support frame members interconnecting said upper frame member and said lower frame member to maintain said upper frame member in spaced apart relation to said lower frame member so as to define a wind collection zone therebetween, said arms configured to rotate said center hub about said vertical axis;

a plurality of sail structures associated with each of said arms, each of said sail structures pivotally attached to said arm support structure of one of said arms so as to pivot between an open position that is substantially aligned with a wind direction and a closed position that substantially closes said wind collection zone, each of said sail structures having a sail configured to collect wind energy from the wind in said wind collection zone when said sail structure is in said closed position, one of said plurality of sail structures on each of said arms being disposed at or near said distal end of said arms so as to define a distal sail structure;

a kicker sail structure attached to or integral with said distal sail structure so as to pivot therewith relative to said arm support structure, said kicker sail structure having a kicker sail pivotally connected to said kicker sail structure so as to pivot said kicker sail structure and said distal sail structure between said open position and said closed position, said kicker sail structure comprising a kicker support frame and a kicker sail section, said kicker support frame disposed between said distal sail structure and said kicker sail section, said kicker support frame having one or more frame members attached to or integral with one or more frame members of said distal sail structure, said kicker sail disposed in and supported by said kicker sail section; and means associated with said sail structure for limiting pivoting movement of said sail structure relative to said arm support structure.

9. The wind energy machine of claim 8, wherein said limiting means comprises a stop section at said distal end of each of said arms, said stop section configured to prevent pivoting of said sail structure past said stop section.

10. The wind energy machine of claim 8, wherein said limiting means comprises a restraining member interconnecting said sail structure and at least one of said arm support structure and said center hub.

11. The wind energy machine of claim 8 further comprising a shroud structure associated with each of said arms, said shroud structure having an upper shroud attached to or integral with said upper frame member of said sail support structure and a lower shroud attached to or integral with said lower frame member of said sail support structure so as to define said wind collection zone therebetween, at least one of said upper shroud and said lower shroud are aerodynamically configured.

12. A wind energy machine, comprising:
a center hub having a vertical axis disposed therethrough, said center hub configured to rotate about said vertical axis;
a drive shaft axially aligned with said vertical axis of said center hub, said drive shaft connected to or integral with an output shaft so as to operate a work object;
a plurality of arms extending outwardly from said center hub, each of said arms having a proximal end disposed towards said center hub and a distal end disposed outwardly therefrom, each of said arms having an arm support structure comprising an upper frame member, a lower frame member and one or more support frame members interconnecting said upper frame member and said lower frame member to maintain said upper frame member in spaced apart relation to said lower frame member so as to define a wind collection zone therebetween, said arms configured to rotate said center hub about said vertical axis;

a plurality of sail structures associated with each of said arms, each of said sail structures pivotally attached to said arm support structure so as to pivot between an open position that is substantially aligned with a wind direction and a closed position that is substantially perpendicular to said wind direction, said sail structures sized and configured to substantially close said wind collection zone when said sail structures are in said closed position, each of said sail structures having one or more frame members supporting a sail configured to collect wind energy from the wind in said wind collection zone when said sail structure is in said closed position, one of said plurality of sail structures on each of said arms disposed at or near said distal end of said arms so as to define a distal sail structure; and a kicker sail structure attached to or integral with said distal sail structure so as to pivot therewith relative to said arm support structure, said kicker sail structure having a kicker sail pivotally connected to said kicker sail structure so as to pivot said kicker sail structure and said distal sail structure between said open position and said closed position, said kicker sail structure comprising a kicker support frame and a kicker sail section, said kicker support frame disposed between said distal sail structure and said kicker sail section, said kicker support frame having one or more frame members attached to or integral with one or more frame members of said distal sail structure, said kicker sail disposed in and supported by said kicker sail section.

13. The wind energy machine of claim 12 further comprising means associated with each of said sail structures for limiting pivoting movement of said sail structure relative to said arm support structure.

14. The wind energy machine of claim 12 further comprising a shroud structure associated with each of said arms, said shroud structure having an upper shroud attached to or integral with said upper frame member of said sail support structure and a lower shroud attached to or integral with said lower frame member of said sail support structure so as to define said wind collection zone therebetween, at least one of said upper shroud and said lower shroud are aerodynamically configured.

* * * * *